(12) United States Patent
Balmin et al.

(10) Patent No.: US 8,813,088 B2
(45) Date of Patent: Aug. 19, 2014

(54) SCHEDULING FLOWS IN A MULTI-PLATFORM CLUSTER ENVIRONMENT

(75) Inventors: Andrey Balmin, San Jose, CA (US); Anshul Dawra, San Jose, CA (US); Kirsten W. Hildrum, Hawthorne, NY (US); Rohit M. Khandekar, Elmsford, NY (US); Deepak Rajan, Fishkill, NY (US); Joel L. Wolf, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 13/116,368

(22) Filed: May 26, 2011

(65) Prior Publication Data

US 2012/0304188 A1 Nov. 29, 2012

(51) Int. Cl.
G06F 9/46 (2006.01)
G06F 9/52 (2006.01)
G06F 9/50 (2006.01)

(52) U.S. Cl.
CPC .............. *G06F 9/52* (2013.01); *G06F 9/5016* (2013.01)
USPC ........................................................ 718/104

(58) Field of Classification Search
CPC ................................ G06F 9/52; G06F 9/5016
USPC ........................................................ 718/104
See application file for complete search history.

(56) References Cited

U.S. PATENT DOCUMENTS

2002/0194248 A1* 12/2002 Wood et al. .................. 709/102
2003/0135621 A1* 7/2003 Romagnoli ................... 709/226

OTHER PUBLICATIONS

Benjamin Hindman et al., "Mesos: A Platform for Fine-Grained Resource Sharing in the Data Center", Sep. 2010, Berkeley Technical Report UCB/EECS-2010-87.*
Hadoop MapReduce. http://hadoop.apache.org/mapreduce/, May 2011.
Hindman et al. Mesos: A Platform for Fine-Grained Resource Sharing in the Data Center, Berkeley Technical Report UCB/EECS-2010-87, Sep. 2010.
Lepere et al. Approximation Scheduling for Malleable Tasks Under Precedence Constraints, 9th Annual European Symposium on Algorithms, Aug. 2001.
IBM InfoSphere Streams, http://www.01.ibm.com/software/data/infosphere/streams/ May 2011, pp. 1-2.

* cited by examiner

*Primary Examiner* — Emerson Puente
*Assistant Examiner* — Steven Do
(74) *Attorney, Agent, or Firm* — Ryan, Mason & Lewis, LLP

(57) ABSTRACT

Techniques for scheduling multiple flows in a multi-platform cluster environment are provided. The techniques include partitioning a cluster into one or more platform containers associated with one or more platforms in the cluster, scheduling one or more flows in each of the one or more platform containers, wherein the one or more flows are created as one or more flow containers, scheduling one or more individual jobs into the one or more flow containers to create a moldable schedule of one or more jobs, flows and platforms, and automatically converting the moldable schedule into a malleable schedule.

8 Claims, 7 Drawing Sheets

SCHEDULING FLOWS IN A MULTI-PLATFORM CLUSTER ENVIRONMENT

FIELD OF THE INVENTION

Embodiments of the invention generally relate to information technology, and, more particularly, to scheduling complex flows across multiple platforms in a computing cluster environment.

BACKGROUND OF THE INVENTION

In existing approaches, challenges exist in scheduling multiple complex flows in a to multi-platform cluster environment, and appropriately distributing resources among the platforms and simultaneously attempting to optimize a given set of per-platform performance metrics. For some platforms, these metrics might be a function of the completion time of each flow, and for others it might be a measure of utility (for example, throughput) achieved by each flow. Existing approaches do not provide solutions to this problem, nor do they provide infrastructure necessary to enforce resource sharing among multiple platforms in a cluster environment and attempt the optimization of the shared resources or the scheduling of the complex flows themselves.

Streaming flows can be complex in the sense that they can be described in terms of flow graphs of long-running software nodes (processing elements (PEs)) connected by streams. MapReduce flows can be complex in the sense that they can be described in terms of flow graphs of Map or Reduce jobs (including multiple independent tasks) connected by precedence relationships. Also, there can be constraints on the minimum amounts of resources allocated to each platform, minimum and maximum amounts of resources allocated to each job, and a notion of the relative rank of each platform.

SUMMARY OF THE INVENTION

Principles and embodiments of the invention provide techniques for scheduling flows in a multi-platform cluster environment. An exemplary method (which may be computer-implemented) for scheduling multiple flows in a multi-platform cluster environment, according to one aspect of the invention, can include steps of partitioning a cluster into one or more platform containers associated with one or more platforms in the cluster, scheduling one or more flows in each of the one or more platform containers, wherein the one or more flows are created as one or more flow containers, scheduling one or more individual jobs into the one or more flow containers to create a moldable schedule of one or more jobs, flows and platforms, and automatically converting the moldable schedule into a malleable schedule.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Principles of the invention include scheduling multiple complex flows in a multi-platform cluster environment. One or more embodiments of the invention can include proceeding hierarchically, both in terms of an allocation/assignment layer hierarchy and in terms of a cluster/platform/flow hierarchy. The allocation layer produces "moldable" schedules which are effectively turned into "malleable" schedules by the assignment layer. By way of explanation, there is a hierarchy in the parallel scheduling literature of rigid, moldable and malleable schedules. Each one is a generalization of the previous. Rigid schedules involve jobs which employ a fixed number of resources for the duration of the job. Thus, jobs can be regarded as rectangles with the axes being resources and time. Moldable schedules involve jobs which employ a potentially variable number of resources, but the number of resources, once chosen, is used for the entire duration of the job. Malleable schedules are a further generalization in which the number of resources assigned to the job can vary at discrete times during the job, resulting in what looks like a series of stacked rectangles of differing widths over time.

Accordingly, one or more embodiments of the invention include using priority-based algorithms, moldable makespan scheduling algorithms and time-indexed, mixed binary programming algorithms. A Mesos-like infrastructure can be employed to deal with resource "offers," "accepts" and "declines." Briefly, Mesos is an infrastructure that assists in the scheduling of multiple platforms over a single cluster. Such an infrastructure has the ability to offer platforms resources, which may be accepted or declined by that platform. If declined, an offer may be given by Mesos to another platform, and so on. Also, as described herein, a scheduler attempts to optimize resource allocations for a general set of objective functions while meeting a variety of real-world constraints.

One or more embodiments of the invention are hierarchical in two ways. First, there is both an allocation (quantity) layer and an assignment (where) layer at a finer temporal level. Second, for the allocation layer, there are cluster, platform and flow functional layers, scheduling the platforms, flows and jobs, respectively.

In the functional hierarchy, the unifying element is the notion of putting the work of each relevant entity in each level into a "container" whose width is the resource allocation and whose length is time.

Figure 1:
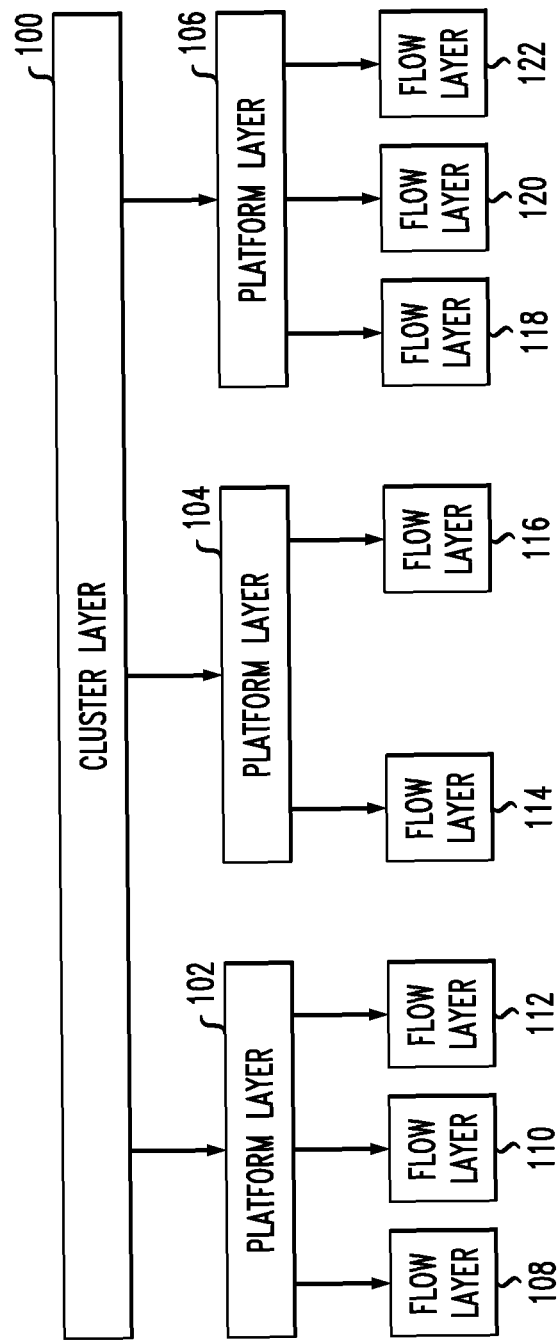
FIG. 1 is a block diagram illustrating functional layers, according to an embodiment of the present invention.

FIG. 1 is a block diagram illustrating functional layers, according to an embodiment of the present invention. By way of illustration, FIG. 1 depicts a cluster layer 100 that partitions the cluster into multiple containers associated with the platforms. As also depicted in FIG. 1, there are three platforms. Namely, platform layers 102, 104 and 106 schedule the flows, created as containers by the flow layer schedulers, in each platform container. Additionally, FIG. 1 depicts that these three platforms have three (108, 110 and 112), two (114 and 116) and three (118, 120 and 122) flows, respectively. Flow layer schedulers 108, 110, 112, 114, 116, 118, 120 and 122 schedule the individual jobs into these flow containers. The end product of the three functional layers is a moldable schedule of jobs, flows and platforms.

Figure 2:
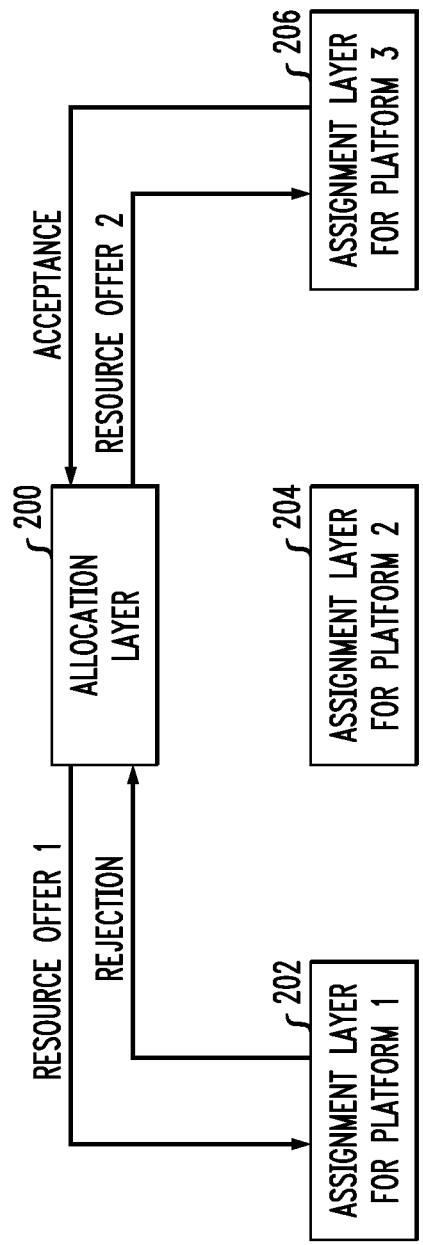
FIG. 2 is a block diagram illustrating allocation and assignment layers, according to an embodiment of the invention.

FIG. 2 is a block diagram illustrating allocation and assignment layers, according to an embodiment of the invention. By way of illustration, FIG. 2 depicts the interaction between allocation layer 200 for the cluster and platform assignment layers 202, 204 and 206 of this example. Using a cluster infrastructure such as, for example, Mesos, the allocation layer moldable schedule is turned into an assignment layer malleable schedule. The Mesos notion of resource offers and acceptances or rejections can also be employed. In the illustrative example of FIG. 2, the allocation layer 200 makes a first resource offer to the assignment layer 202 for the first platform. This offer is rejected. The allocation layer 200 then makes a second resource offer to the assignment layer 206 for the third platform. This offer is accepted.

Additionally, in the cluster layer, it can be assumed that each platform has a rank and a guarantee of a minimum number of resources that must be offered it if they are actually needed. Each job in every flow in a given platform can also have a minimum resource guarantee during the time it is active, and a maximum useful resource allocation during the time it is active. For each cluster layer invocation, one or more embodiments of the invention thus identifies, for each platform, the maximum useful resource allocations of jobs in the platform at that time. This is the sum of the maxima of the ready jobs of the flows for that platform.

One or more embodiments of the invention also include partitioning the cluster over time into time-invariant containers of resource allocations associated with each platform. This can be carried out sequentially by iterating over all ranks at that level. At each level, the sum of the guaranteed minima for the platforms at that level is known. Accordingly, one or more embodiments of the invention include computing the sum of the guaranteed minima for the platforms at lower ranks. This leaves some "slack," which can be shared fairly among the platforms of the same rank, up to their respective usable maxima waterlines.

Further, by way of example, assume that the platforms are assigned a rank index r, from 1 to R. Rank r=1 is higher than rank r=2, and so on, up to rank r=R. There may be ties in this rank, creating levels. Define $m_r$ to be the minimum resource allocation for the platforms with rank r. Define $M_r$ to be the maximum useful resource allocation for platform with rank r. Also, define S to be the total number of resources in the cluster. (It is to be appreciated that resources are most typically defined in terms of the number of cores, or the number of slots.)

Pseudo-code for the allocation scheme is given below. The pseudo-code employs a variable u which represents the amount of slots used thus far. The pseudo-code also employs a variable s which represents the current total slack.

```
Set s = 0
Set u = 0
For(r = 1; r <= R,r++)
{
    Set s = s+m_r.
}
For (r = 1;r <= R,r++)
{
    Set a_r = min(m_r+ (S − u − m_r), M_r).
    Set u = u + a_r.
    Set s = s − a_r.
}
```

The resource allocation for the individual platforms with rank r is then apportioned using a FAIR allocation scheme based on the total allocation $a_r$. That is, each platform receives its own minimum allocation, and the remaining slack is apportioned evenly amongst the platforms.

Figure 3:
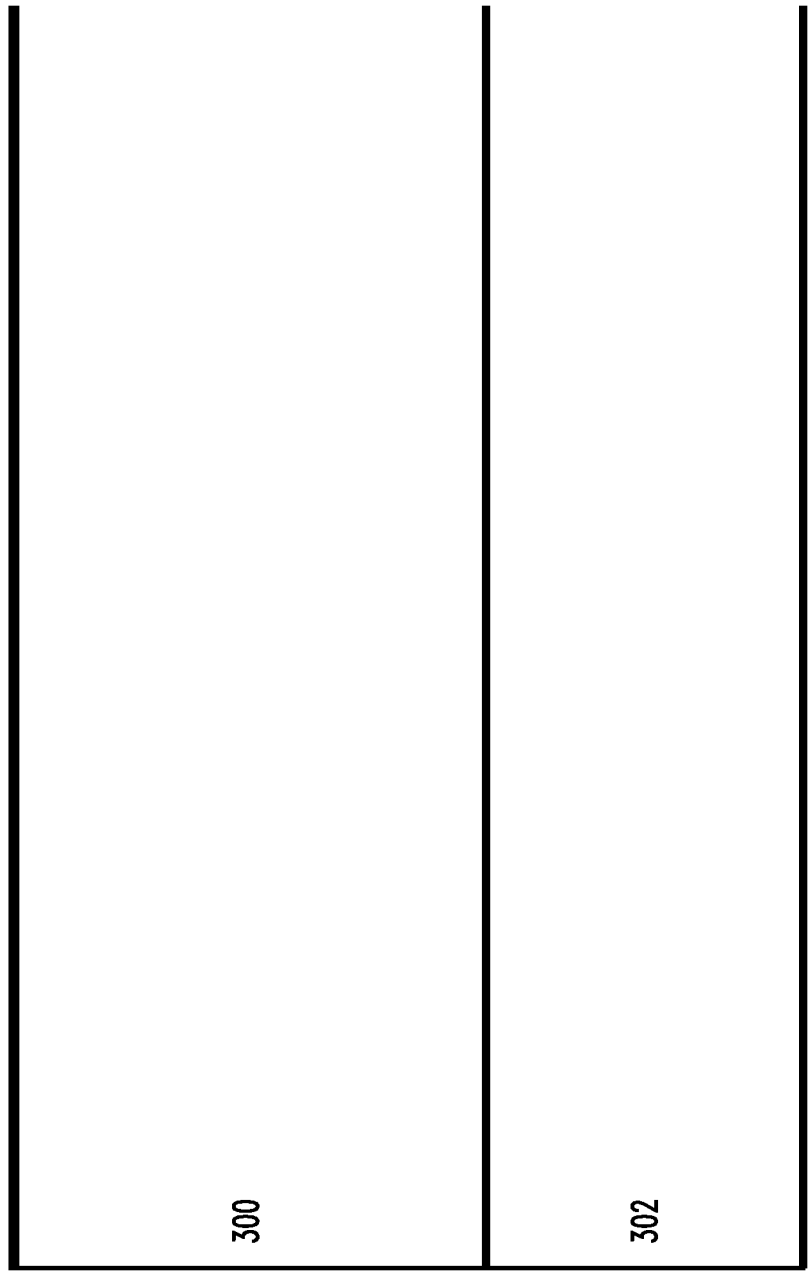
FIG. 3 is a diagram illustrating platform scheduler containers, according to an embodiment of the present invention.

FIG. 3 is a diagram illustrating platform scheduler containers, according to an embodiment of the present invention. By way of illustration, FIG. 3 depicts the creation of time-invariant allocation containers in a two-platform example. The platforms are identified as 300 and 302, respectively, in FIG. 3. It is noted that it is irrelevant to the example whether or not the example corresponds to a single rank level or to two separate rank levels.

In one or more embodiments of the invention, each platform for which a pre-existing platform scheduler exists can simply invoke that scheduler, completing the allocation layer. Also, in one or more embodiments of the invention, the platform and flow layer allocation schedulers of a present scheduler can be invoked regardless. In scenarios where they are invoked, in either case, these two layers can be described as follows.

The platform layer invokes a moldable makespan scheduler for the jobs in each alternative flow and each resource level less than or equal to the container width. The objective function goal is to minimize the makespan of this flow, given the minimum and maximum job allocation constraints and the relevant precedence constraints among the jobs. The overall process produces, for each flow, a moldable container in which the jobs can be scheduled in a relatively optimal manner.

Additionally, a two-phase ready-list moldable scheduling scheme that includes the ability to approximately solve a case with precedence constraints (such as, by way of example, the scheme described in Lepere, Trystram and Woeginger (LTW), Approximation Scheduling for Malleable Tasks Under Precedence Constraints, 9th Annual European Symposium on Algorithms) can be invoked for a particular flow and a particular container width r. The jobs in the flow are related by a precedence relationship that determines whether job j must be completed before job k starts. A ready-list is a subset of the jobs that varies over time and describes, at each moment in time, which jobs are ready to be scheduled based on the precedence relation. Such a scheme provides a schedule that approximately minimizes the makespan.

Figure 4:
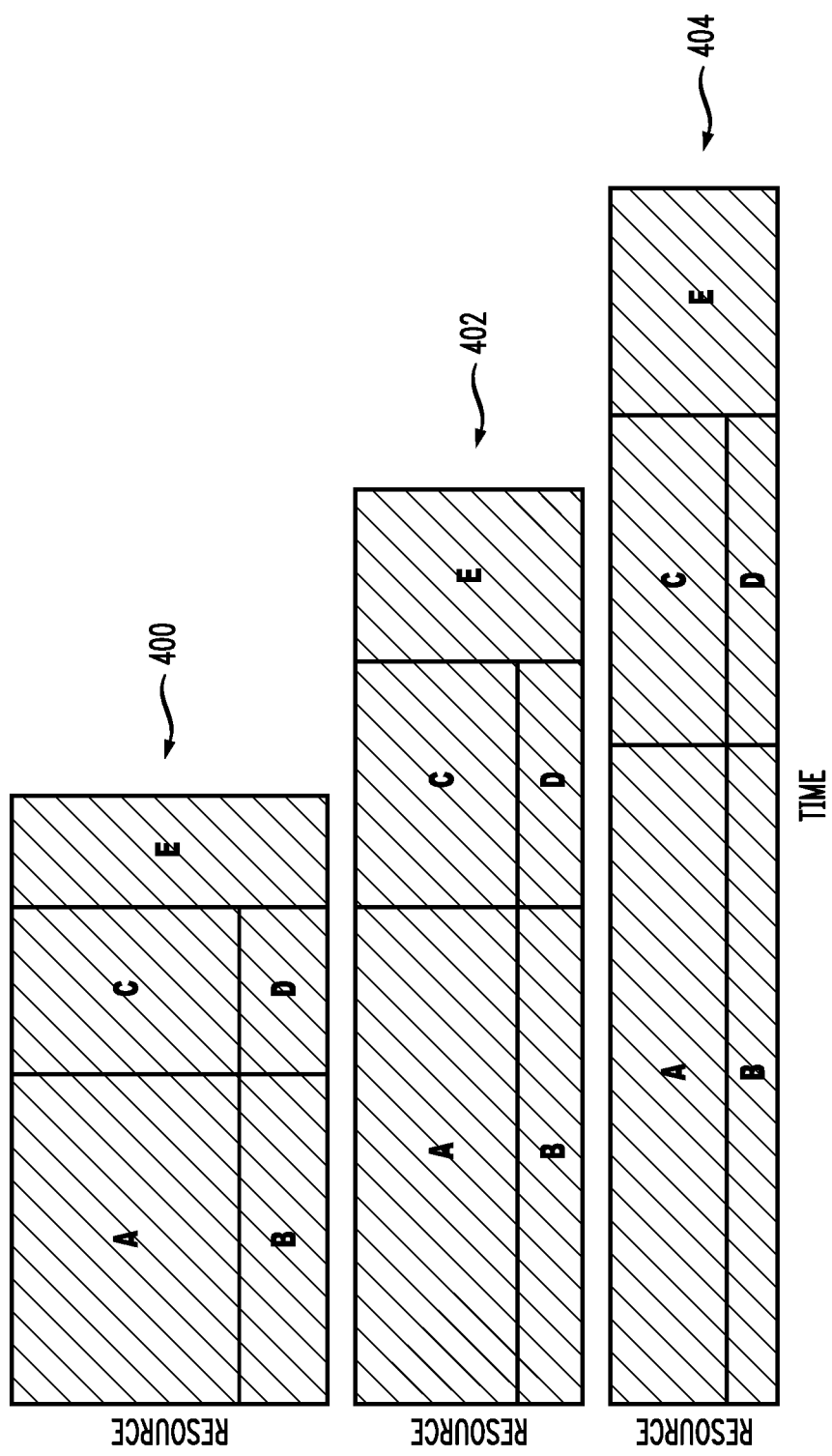
FIG. 4 is a diagram illustrating moldable flow scheduling, according to an embodiment of the invention.

FIG. 4 is a diagram illustrating moldable flow scheduling, according to an embodiment of the invention. FIG. 4 depicts moldable schedules for a five job flow with precedence between jobs A and C, between jobs B and D, and between jobs C, D and E. Three separate schedules for three separate total levels of resource are shown in 400, 402 and 404. If the speed-up functions associated with the jobs are linear, for example, in MapReduce platforms, the three separate solutions produced may be exactly comparable, given the moldable nature of the entire schedules.

The output of these containerized moldable schedules of the individual flows is fed to the platform layer. In the platform layer, the flows can be scheduled for arbitrary objective functions of their completion times via a time-indexed, mixed binary program. The effect of this three level allocation process is to create "moldable" container-based schedules for each platform, flow and job.

Figure 5:
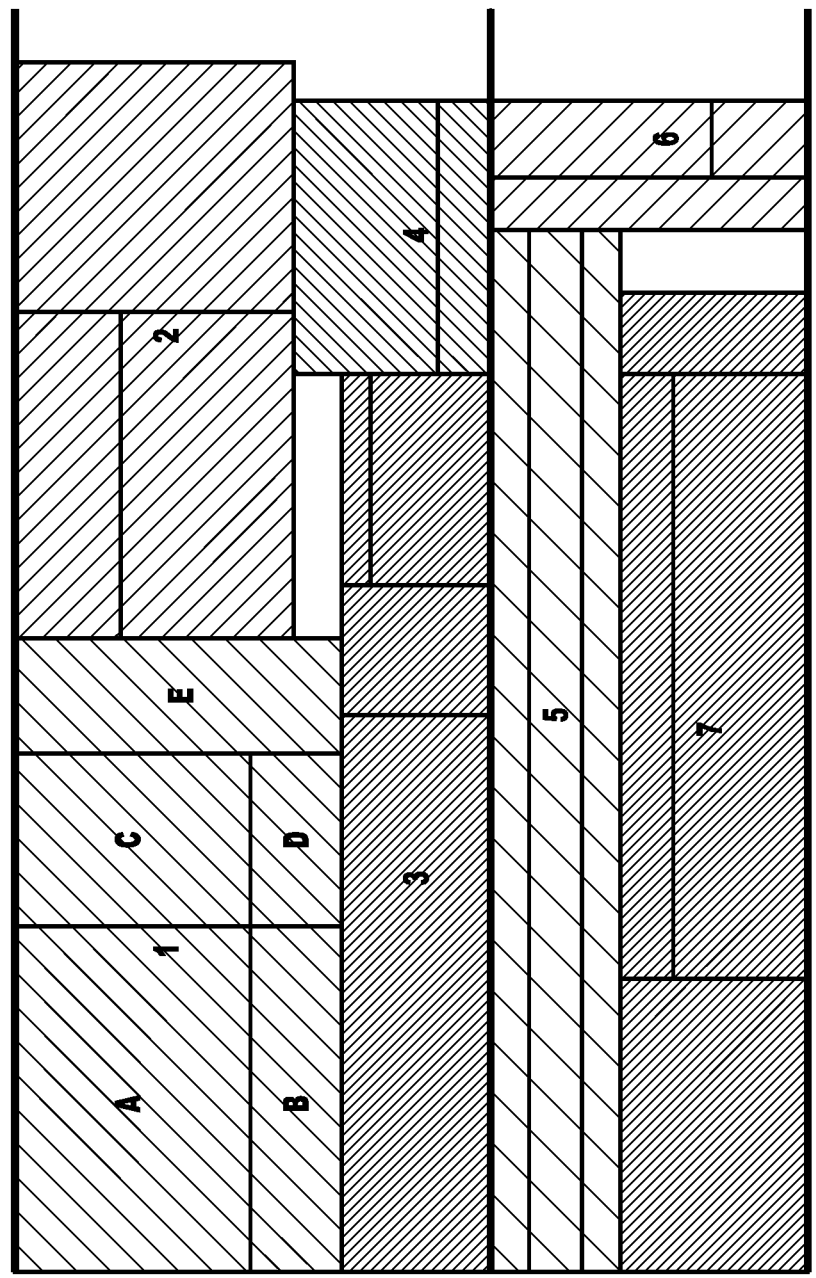
FIG. 5 is a diagram illustrating allocation layer moldable scheduling, according to an embodiment of the present invention.

FIG. 5 is a diagram illustrating allocation layer moldable scheduling, according to an embodiment of the present invention. FIG. 5 illustrates a moldable container-based schedule, including the flow described in FIG. 4 as flow 1. There are also flows 2 through 7. Flows 1 through 4 are from the first platform in FIG. 3, and flows 5 through 7 are from the second platform. In the figure, all jobs reside in their containers, which, in turn, reside in their larger containers.

At the assignment layer, a Mesos-like infrastructure can be employed, involving resource offers, acceptances and rejections. One or more embodiments of the invention include keeping track of the actual per platform usage, and offering any newly available resource based on the order of the difference between actual and goal resource usage. Additionally, in one or more embodiments of the invention, platforms with pre-existing schedulers can decide on the appropriate job to be scheduled, or can decide not to accept the offer. Otherwise, or for platforms without a pre-existing scheduler, actual/goal difference scheme similar to the platform scheme can be used, or an affinity-based scheme can be used to decide not to accept an offer.

This negotiation process effectively turns the theoretical moldable schedule into a "malleable" schedule. The allocation scheduler wakes up periodically to revisit its decisions. In the case of jobs which repeat periodically, the history of the resources utilized and performance achieved is used as input data. In the case of new jobs, advance sentinels can be employed as appropriate in order to estimate this resource/performance trade-off.

Figure 6:
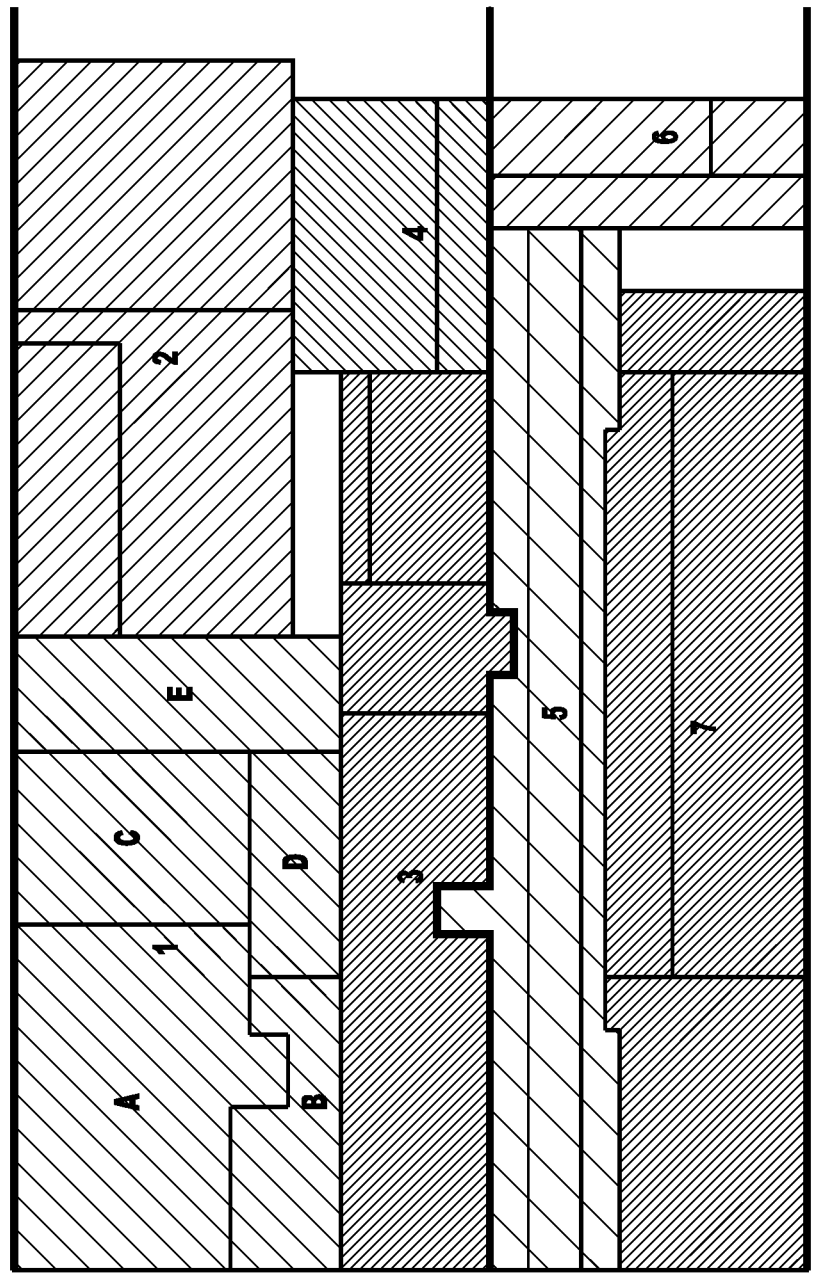
FIG. 6 is a diagram illustrating assignment layer malleable scheduling, according to an embodiment of the present invention.

FIG. 6 is a diagram illustrating assignment layer malleable scheduling, according to an embodiment of the present invention. By way of illustration, FIG. 6 depicts the notion of the assignment layer turning a moldable schedule produced by the allocation layer into a malleable schedule. Note that this can happen both within the individual flow containers, as in flows 1 and 7, or across the various platforms, as occurs between the two platforms in this example. Note also that real completion times of the jobs and flows may differ from estimated completion times, such as occurs in job 2.

Figure 7:
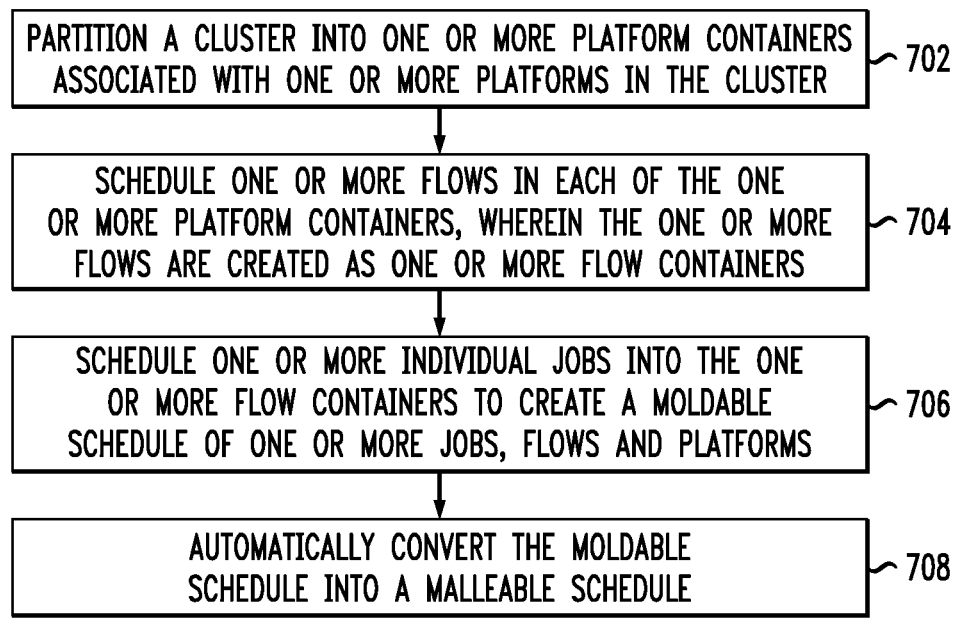
FIG. 7 is a flow diagram illustrating techniques for scheduling multiple flows in a multi-platform cluster environment, according to an embodiment of the invention.

FIG. 7 is a flow diagram illustrating techniques for scheduling multiple flows in a multi-platform cluster environment, according to an embodiment of the present invention. Step 702 includes partitioning a cluster into one or more platform containers associated with one or more platforms in the cluster. This step can be carried out, for example, using a cluster layer module. Partitioning a cluster into platform containers associated with platforms in the cluster can include incorporating, for each platform, a rank and a guarantee of a minimum number of resources offered. Also, partitioning a cluster can further include identifying, for each platform, a maximum useful resource allocation of one or more jobs in the platform at that time.

Partitioning a cluster into platform containers associated with one or more platforms in the cluster can additionally include partitioning a cluster into time-invariant containers of resource allocations associated with each platform. Further, partitioning a cluster into time-invariant containers of resource allocations associated with each platform can include sequentially iterating over all ranks at a platform level. Partitioning a cluster into time-invariant containers can also include computing a sum of guaranteed minima for each platform at lower ranks to provide slack that can be shared fairly among the platforms of the same rank, up to a respective usable maxima waterline.

Step 704 includes scheduling one or more flows in each of the one or more platform containers, wherein the one or more flows are created as one or more flow containers. This step can be carried out, for example, using a platform layer module and/or a flow layer scheduler module. Scheduling flows in each of the platform containers can include minimizing a makespan of each flow, given minimum and maximum job allocation constraints and relevant precedence constraints among one or more jobs.

Step 706 includes scheduling one or more individual jobs into the one or more flow containers to create a moldable schedule of one or more jobs, flows and platforms. This step can be carried out, for example, using a flow layer scheduler module and/or an allocation layer module. Each job in every flow in a given platform can have a minimum resource guarantee during a time it is active, and a maximum useful resource allocation during a time it is active.

Step 708 includes automatically converting the moldable schedule into a malleable schedule (for example, an assignment layer malleable schedule). In one or more embodiments of the invention, the moldable to malleable conversion occurs automatically via the allocation/assignment layer affinity-based offerings/acceptances/rejections. This step can be carried out, for example, using a cluster infrastructure module. Converting the moldable schedule into a malleable schedule can include employing a cluster infrastructure, wherein employing a cluster infrastructure includes using a resource offer, an acceptance and/or a rejection.

The techniques depicted in FIG. 7 can additionally include periodically revisiting the scheduling of one or more individual jobs into the flow containers to create a moldable schedule. Also, one or more embodiments of the invention can include tracking actual per platform usage, and offering any newly available resource based on an order of a difference between actual and goal resource usage. Further, the techniques depicted in FIG. 7 can include using history of resources utilized and performance achieved as input data in a case of a job that repeats periodically, and employing advance sentinels to estimate a resource versus performance trade-off in a case of a new job.

The techniques depicted in FIG. 7 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a cluster layer module, a platform layer module, a flow layer scheduler module, an allocation layer module, an assignment layer module and a cluster infrastructure module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 8:
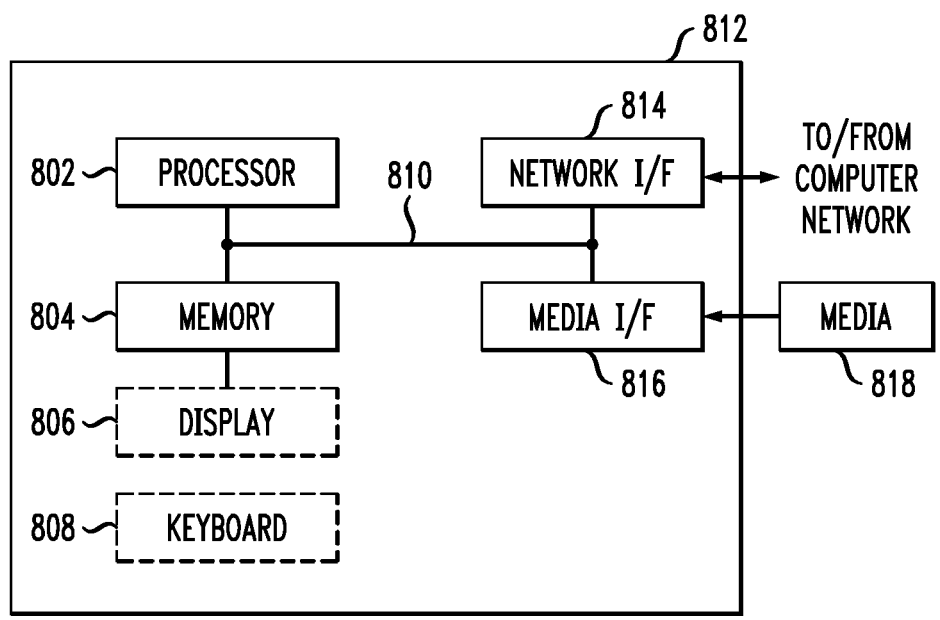
FIG. 8 is a system diagram of an exemplary computer system on which at least one embodiment of the invention can be implemented.

One or more embodiments can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. Media block 818 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed in the figures and corresponding descriptions herein. The method steps can then be carried out using the distinct software modules and/or submodules of the system, as described above, executing on one or more hardware processors 802. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, scheduling multiple complex flows in a multi-platform cluster environment, and appropriately distributing resources among the platforms.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A computer program product comprising a tangible computer readable recordable storage medium including computer useable program code for scheduling multiple flows in a multi-platform cluster environment, the computer program product including:
   computer useable program code for partitioning a cluster into multiple platform containers, wherein each platform container is a section associated with use by one respective platform of multiple platforms in the cluster;
   computer useable program code for scheduling one or more flows in each of the multiple platform containers, wherein the one or more flows are created as one or more flow containers;
   computer useable program code for scheduling one or more individual jobs into each of the one or more flow containers to create a moldable schedule of one or more jobs, flows and platforms, wherein the moldable schedule comprises each of the one or more jobs associated with a set of resources from a variable number of resources to be used for the entire duration of the job;
   computer useable program code for automatically converting the moldable schedule into a malleable schedule, wherein the malleable schedule comprises each of the one or more jobs associated with a varying number of resources at multiple discrete times during the duration of the job;
   computer useable program code for tracking per platform resource usage during each of the one or more jobs; and
   computer useable program code for offering additional resource to one or more of the one or more jobs based on an order of a difference between actual resource usage and goal resource usage for during each of the one or more jobs.

2. The computer program product of claim 1, wherein the computer useable program code for partitioning a cluster into multiple platform containers associated with use by one or more platforms in the cluster comprises computer useable program code for partitioning a cluster into multiple time-invariant containers of resource allocations associated with each platform.

3. The computer program product of claim 1, wherein the computer useable program code for scheduling one or more flows in each of the multiple platform containers comprises computer useable program code for minimizing a makespan of each flow, given one or more minimum and maximum job allocation constraints and one or more relevant precedence constraints among one or more jobs.

4. The computer program product of claim 1, wherein the computer useable program code for converting the moldable schedule into a malleable schedule comprises computer useable program code for employing a cluster infrastructure, wherein employing a cluster infrastructure comprises using one or more of a resource offer, an acceptances and a rejection.

5. A system for scheduling multiple flows in a multi-platform cluster environment, comprising:
   a memory; and
   at least one processor coupled to the memory and operative to:
      partition a cluster into multiple platform containers, wherein each platform container is a section associated with use by one respective platform of multiple platforms in the cluster;
      schedule one or more flows in each of the multiple platform containers, wherein the one or more flows are created as one or more flow containers;
      schedule one or more individual jobs into each of the one or more flow containers to create a moldable schedule of one or more jobs, flows and platforms, wherein the moldable schedule comprises each of the one or more jobs associated with a set of resources from a variable number of resources to be used for the entire duration of the job;
      automatically convert the moldable schedule into a malleable schedule, wherein the malleable schedule comprises each of the one or more jobs associated with a varying number of resources at multiple discrete times during the duration of the job;
      track per platform resource usage during each of the one or more jobs; and
      offer additional resource to one or more of the one or more jobs based on an order of a difference between actual resource usage and goal resource usage for during each of the one or more jobs.

6. The system of claim 5, wherein the at least one processor coupled to the memory operative to partition a cluster into multiple platform containers associated with use by one or more platforms in the cluster is further operative to partition a cluster into multiple time-invariant containers of resource allocations associated with each platform.

7. The system of claim 5, wherein the at least one processor coupled to the memory operative to schedule one or more flows in each of the multiple platform containers is further operative to minimize a makespan of each flow, given one or more minimum and maximum job allocation constraints and one or more relevant precedence constraints among one or more jobs.

8. The system of claim 5, wherein the at least one processor coupled to the memory operative to convert the moldable schedule into a malleable schedule is further operative to employ a cluster infrastructure, wherein employing a cluster infrastructure comprises using one or more of a resource offer, an acceptances and a rejection.

* * * * *